United States Patent [19]
Akitake et al.

[11] Patent Number: 5,293,192
[45] Date of Patent: Mar. 8, 1994

[54] CAMERA

[75] Inventors: Hiroshi Akitake; Kazuhiro Satoh, both of Sagamihara; Shigeo Hayashi, Okaya, all of Japan

[73] Assignee: Olympus Optical Co., Ltd., Tokyo, Japan

[21] Appl. No.: 999,108

[22] Filed: Dec. 31, 1992

[30] Foreign Application Priority Data

Jan. 8, 1992 [JP] Japan .................. 4-001778

[51] Int. Cl.⁵ .................................. G03B 13/02
[52] U.S. Cl. .......................... 354/219; 354/195.12; 354/286; 359/695; 359/700; 359/701
[58] Field of Search .............. 354/195.12, 219, 286; 359/695, 700, 701

[56] References Cited
U.S. PATENT DOCUMENTS

4,281,907  8/1981  Kamata ................. 359/700
4,945,372  3/1990  Higuchi et al. .......... 354/199

Primary Examiner—Monroe H. Hayes
Attorney, Agent, or Firm—Louis Weinstein

[57] ABSTRACT

A camera of the present invention comprises a stationary frame adjustable in position with respect to a camera body in the direction of an optical axis; a cam frame disposed around an outer circumference of the stationary frame to be rotatable about the optical axis and movable in a direction of the optical axis with respect to the stationary frame; a finder optical system provided on the camera body; and a finder optical system driving cam provided integrally with the cam frame for driving the finder optical system. In-focus position adjustment of a photographing optical system of the camera is performed during assembly by moving only the stationary frame in the direction of the optical axis, while the cam frame is kept immobile with respect to the camera body.

26 Claims, 6 Drawing Sheets

CAMERA

BACKGROUND OF THE INVENTION

1. Field of the Invention

The present invention relates to a camera, and more particularly to a camera of the type that in-focus position adjustment of a photographing optical system is performed during assembly.

2. Related Art Statement

In a conventional camera having a zoom lens, it has been usual to perform, when assembled, in-focus position adjustment (hereinafter referred to as fc adjustment) of a photographing optical system and adjustment (hereinafter referred to as Zp adjustment) for making a difference in amount of the fc adjustment between a wide-angle state and a telephoto state of the zoom lens not larger than a predetermined value.

Taking a zoom lens barrel disclosed in U.S. Pat. No. 4,945,372, assigned to the applicant, as an example, a description will be given of how the fc adjustment and the Zp adjustment have conventionally been carried out. The teachings of U.S. Pat. No. 4,945,372 are incorporated herein by reference thereto.

Figure 8:
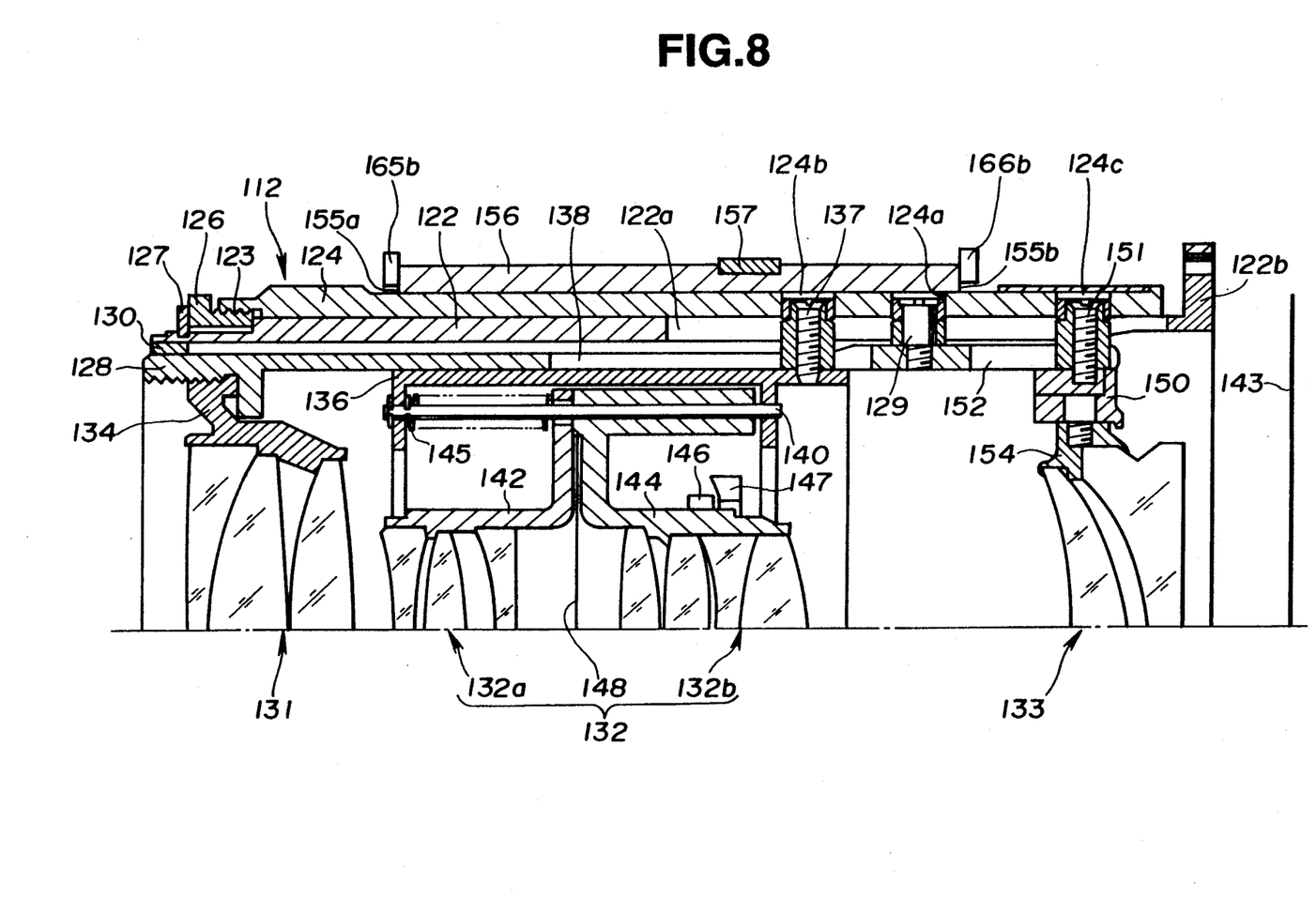
FIG. 8 is a sectional view showing a zoom lens barrel in the prior art.

FIG. 8 is a sectional view showing the disclosed zoom lens barrel.

The zoom lens barrel has a cam ring 124 fitted radially outwardly of a stationary frame 122 in a rotatable manner which is fixed to a camera body (not shown). A movable frame 128 is fitted radially inwardly of the stationary frame 122, with a second group frame 136 and a third group frame 150 being fitted radially inwardly of the movable frame 128. Further, an adjuster ring 126 is screwed to a distal end of the cam ring 122 and a retainer ring 127 is fixed in a circumferential groove at a distal dnd of the stationary frame 122. A stepped portion formed by the retainer ring 127 and the stationary frame 122 serves to restrict a movement the adjuster ring 126 in the direction of an optical axis. Radially outwardly of the cam ring 124, an interlock plate 156 is fixed by screws to be integral therewith. A geared portion 157 is provided around an outer circumference of the interlock plate 156, and an arm 165b of a frame 165 and an arm 166b of a frame 166, both being provided in a finder lens group, are arranged to respectively come into abutment against opposite end faces 155a, 155b of the interlock plate 156 in the direction of the optical axis. Note frames 65 and 66 of finder 16 in FIG. 3 of U.S. Pat. No. 4,945,372.

A first lens group 131 is held by the movable frame 128 through a first group frame 134, a second lens group 132 is held by the second group frame 136 through a front group holding frame 142 and a rear group holding frame 144, and further a third lens group 133 is held by the third group frame 150 through a holder frame 154, respectively.

Operation of the above prior art thus constructed will be explained below.

When the geared portion 157 receives an output from a zoom drive unit (not shown), the cam ring 124 fixed to be integral with the interlock plate 156 is rotated about the optical axis with respect to the stationary frame 122. The rotation of the cam ring 124 causes the first lens group 131, the second lens group 132 and the third lens group 133 to move through respective appropriate distances in the direction of the optical axis according to the relationship between a straightforward groove defined in the stationary frame 122 and a cam groove defined in the cam ring 124.

The Zp adjustment is provided to make a difference in amount of the fc adjustment between a wide-angle state and a telephoto state of the zoom lens not larger than a predetermined value, as mentioned above, and is carried out, for example, in the foregoing prior art by moving the holder frame 154 back and forth with respect to the third group frame 150.

The fc adjustment is carried out in the foregoing prior art by rotating the adjuster ring 126 to move the cam ring 124 back and forth in the direction of the optical axis with respect to the stationary frame 122, thereby moving the first lens group 131, the second lens group 132 and the fourth lens group 133 back and forth in the direction of the optical axis.

With the fc adjustment carried out in the prior art as explained above, however, the position of the cam ring 124 in the direction of the optical axis is not definite with respect to the stationary frame 122, i.e., the camera body (not shown).

On the other hand, a finder unit (not shown) is fixed to the camera body. Therefore, if the arm 165b of the frame 165 and the arm 166b of the frame 166 are not in preset reference positions with respect to the camera body, the lens-to-lens spacing in the finder would not be determined by the fixed positions and hence the relationship between the photographing lens and the finder could not be kept normal. Accordingly, adjusting means has been required which is used to shift the position of the interlock plate 156 with respect to the cam ring 124 in the direction of the optical axis after carrying out the fc adjustment, so that the interlock plate 156 is always located at a fixed position with respect to the camera body and the finder.

Further, because of the need of adjusting the relative position between the cam ring 124 and the interlock plate 156 fixed to each other, as mentioned above, the cam ring 124 and the interlock plate 156 can not be formed into a one-piece unit, thus resulting in a larger number of parts and an increased cost.

OBJECTS AND SUMMARY OF THE INVENTION

A first object of the present invention is to provide a camera in which in-focus position adjustment of a photographing optical system can be performed during assembly without adjusting a position of finder driving means.

A second object of the present invention is to provide a camera that when in-focus position adjustment of a photographing optical system is performed during assembly, there is no need of positioning a finder optical system driving cam with respect to a cam frame in the direction of an optical axis.

A third object of the present invention is to provide a camera that a cam frame and a finder optical system driving cam can be formed into a one-piece unit, so that the cost can be cut down with a reduced number of parts.

A fourth object of the present invention is to provide a camera that a circumferential groove for restricting a position of a finder in the direction of an optical axis and a finder optical system driving cam can be designed readily and with a larger degree of freedom.

In summary, a camera of the present invention comprises:

a stationary frame adjustable in position with respect to a camera body in the direction of an optical axis;

a cam frame disposed around an outer circumference of said stationary frame to be rotatable about the optical axis and movable in the direction of the optical axis with respect to said stationary frame;

a finder optical system provided on said camera body; and a finder optical system driving cam provided integrally with said cam frame for driving said finder optical system, wherein in-focus position adjustment of a photographing optical system of said camera is performed during assembly by moving only said stationary frame in the direction of the optical axis, while said cam frame is kept immobile with respect to said camera body.

These and other objects and advantages of the present invention will become further apparent from the following detailed explanation.

DETAILED DESCRIPTION OF THE PREFERRED EMBODIMENTS

Hereinafter, preferred embodiments of the present invention will be described with reference to the drawings.

Figure 1:
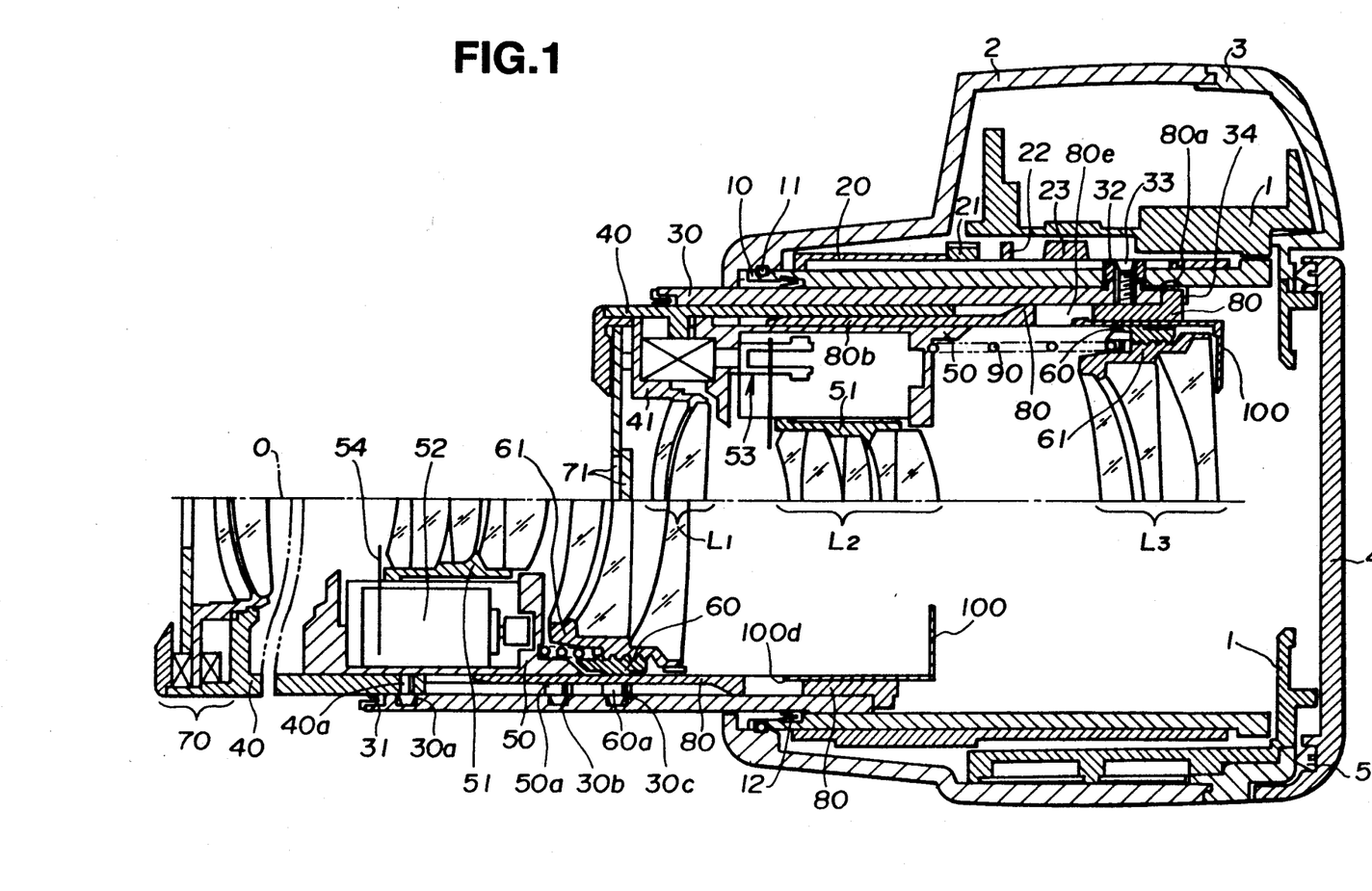
FIG. 1 is a sectional view of a camera according to a first embodiment of the present invention.
Figure 2:
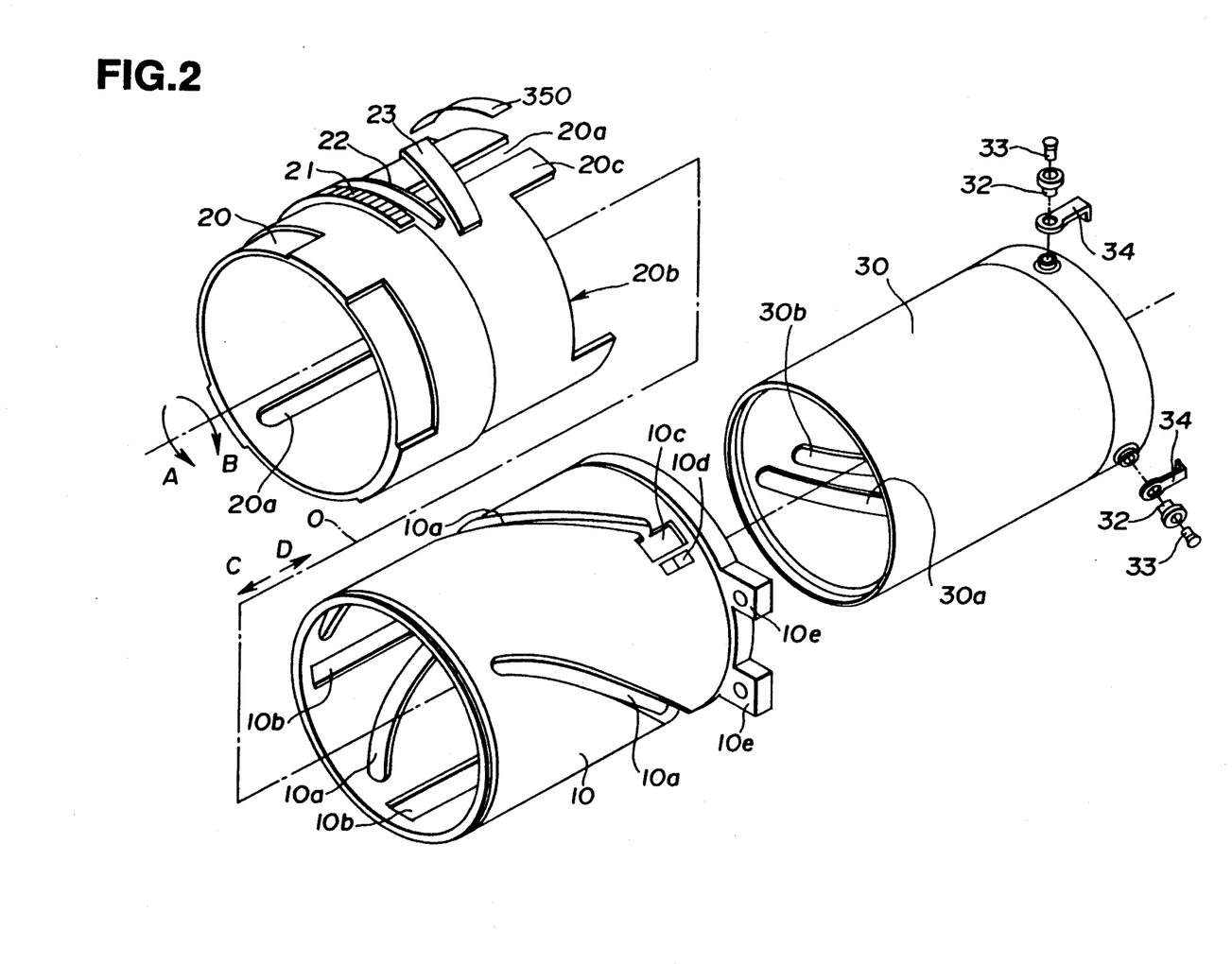
FIG. 2 is an exploded perspective view in which a part of the components of a lens barrel in the camera of the first embodiment is withdrawn out in the direction of an optical axis.
Figure 3:
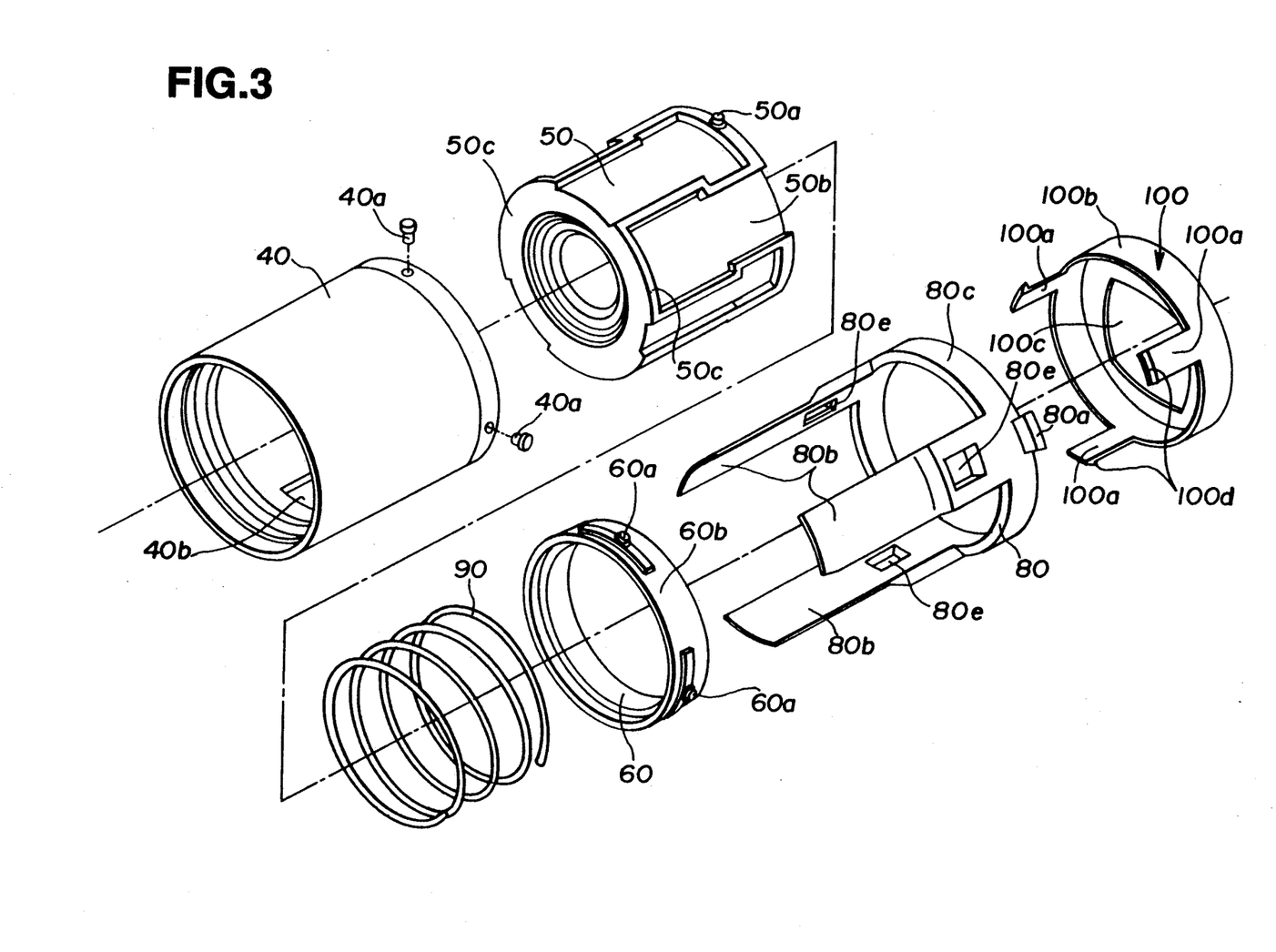
FIG. 3 is an exploded perspective view in which another group of components of the lens barrel in the camera of the first embodiment, different from the components shown in FIG. 2, is withdrawn out in the direction of the optical axis.

FIG. 1 is a sectional view showing principal components of a camera according to a first embodiment of the present invention. FIGS. 2 and 3 are each an exploded perspective view in which components of a lens barrel in the camera of the first embodiment are withdrawn out in the direction of an optical axis. Note that the components shown as disassembled in FIGS. 2 and 3 belong to the same lens barrel.

The camera of the first embodiment shown in FIG. 1 is of a camera provided with a zoom lens barrel. The zoom lens barrel includes a stationary cylinder 10 attached integrally to a camera body 1. An upper half of FIG. 1 shows a wide-angle state where a zoom lens is moved to a wide-angle position, while a lower half of FIG. 1 shows a telephoto state where the zoom lens is moved to a telephoto position.

The camera of the first embodiment mainly comprises a front cover 2 covering a front portion of the camera body 1, a rear cover 3 covering a rear portion of the camera body 1, and a back lid 4. The back lid 4, attached by a hinge (not shown) to the rear cover 3 to be capable of opening and closing, is closed in an optically sealed manner with the aid of a light shielding elastic member 5.

The zoom lens barrel comprises a drive cylinder 20 rotatably fitted over an outer circumference of the stationary cylinder 10 and prevented from moving in the direction of the optical axis; a cam cylinder 30 fitted to an inner circumference of the stationary cylinder 10 and driven by the drive cylinder 20 to move back and forth in the direction of the optical axis while rotating; a first lens cylinder 40, a second lens cylinder 50 and a third lens cylinder 60 disposed in the cam cylinder 30 in this order from the front and individually movable back and forth in the direction of the optical axis; a float key 80 disposed in the cam cylinder 30, prevented by a key receiving member 34 from moving in the direction of the optical axis, and prevented by the stationary cylinder 10 from rotating about the optical axis to thereby restrict rotation of the first lens cylinder 40, the second lens cylinder 50 and the third lens cylinder 60 about the optical axis; a barrier unit 70 (see FIG. 1) disposed in the front side of the first lens cylinder 40 and having a barrier 71 opened and closed by a barrier driver 53 (see FIG. 1) supported in the second lens cylinder 50; a shutter blade 54 (see FIG. 1) opened and closed by a shutter unit 52 (see FIG. 1) supported in the second lens cylinder 50; an elastic member 90 in the form of a coil spring stretched between the second lens cylinder 50 and the third lens cylinder 60 for absorbing play in fitting between drive rollers 50a, 60a and cam slots 30b, 30c (described later); and a flare diaphragm 100 attached to a rear portion of the float key 80.

The drive cylinder 20 includes a drive gear 21, a guide rib 22 and an interlock cam 23 which are all provided on its outer circumferential surface in the form of a partial circular arc and are arranged in this order from the front. The drive gear 21 and the guide rib 22 are disposed with a spacing therebetween corresponding to a diameter of a guide pin 110a which is provided integrally with a later-described finder frame 110 (see FIG. 4). The drive gear 21 receives a drive force from a zoom drive unit (not shown) and rotates the drive cylinder 20 in the counterclockwise direction A or in the clockwise direction B (see FIG. 2) about an optical axis O, the drive cylinder 20 being guided by the guide rib 22. The interlock cam 23 serves to move a lens of a finder optical system (not shown) for zooming operation. Further, the drive cylinder 20 has elongate guide slots 20a bored at respective positions trisected in the circumferential direction and extending in the direction of the optical axis, and a cut-out 20b formed at its rear end for allowing a date imprinting beam from a later-described data unit (not shown) to pass therethrough. Additionally, an encoder 350 for detecting an amount of rotation of the drive cylinder 20 is provided in a rear end portion of the drive cylinder 20.

The stationary cylinder 10 has leading cam slots 10a bored to extend over respective regions circumferentially trisecting its circumferential surface for moving the cam cylinder 30 back and forth in the direction of the optical axis while rotating it, and straightforward grooves 10b formed in its inner circumferential surface at respective positions circumferentially trisecting the same for fitting with later-described guide projections 80a of the float key 80. Then, as shown in FIG. 2, a rectangular through hole 10c with longer sides extending in the direction of the optical axis is formed in a rear end portion of the stationary cylinder 10, facing the film plane side, at a position adjacent to a terminal end of one of the cam slots 10a which locates in the upper side of the camera. The through hole 10c is arranged to be superposed with the cutout 20b of the drive cylinder 20 when an actual exposure is made, so that it passes the date imprinting beam from the data unit, as data imprinting means, toward the film surface. In the side of the through hole 10c opposite to the terminal end of the cam slot 10a, there is provided a stop projection 10d on the outer circumferential surface of the stationary cylinder 10 for restricting rotation of the drive cylinder 20. Note that lugs 10e provided in a rear end portion of the stationary cylinder 10 to radially project therefrom are used for mounting the zoom lens barrel to the camera body 1.

Figure 6:
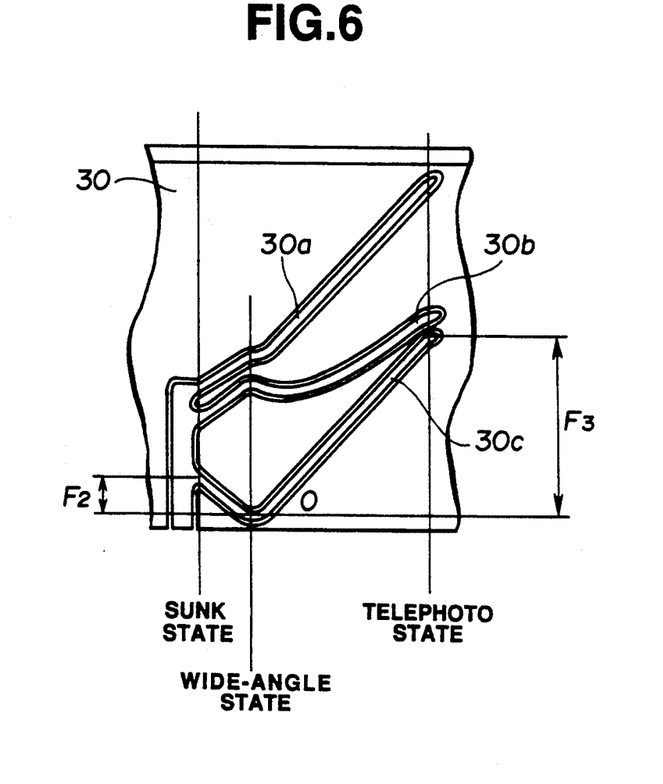
FIG. 6 is a plan view showing cam grooves, in developed representation, formed in a circumferential surface of a cam cylinder in the camera of the first embodiment.

The cam cylinder 30 fitted to the inner circumference of the stationary cylinder 10 has cam grooves 30a formed in its inner circumferential surface to extend over respective regions circumferentially trisecting the same for moving the first lens cylinder 40 in the direction of the optical axis for zooming operation, and cam grooves 30b, 30c likewise formed in its inner circumferential surface to extend over respective regions circumferentially trisecting the same for moving the second and third lens cylinders 50, 60, respectively, in the direction of the optical axis for zooming operation. Configurations of the cam grooves 30a to 30c are detailed in FIG. 6. FIG. 6 shows a part of the inner circumferential surface of the cam cylinder 30 which is cut away and developed into the flat form. In FIG. 6, the reference character F2 indicates a distance through which the third lens cylinder 60 moves with respect to the float key 80 when lens groups are shifted from a wide-angle state to a sunk state. Also, the reference character F3 indicates a distance through which the third lens cylinder 60 moves with respect to the float key 80 when the lens groups are shifted from a wide-angle state to a telephoto state.

Referring to FIG. 2 again, drive rollers 32 for the zooming operation are fixed by screws 33 to an outer circumferential surface of the cam cylinder 30 in its rear end portion at respective circumferentially trisected positions. The drive rollers 32 penetrate through the cam slots 10a of the stationary cylinder 10 and are fitted into the elongate guide slots 20a of the drive cylinder 20. Accordingly, when the drive cylinder 20 is rotated about the optical axis O, the drive rollers 32 for zooming operation are also rotated through the elongate guide slots 20a so that the cam cylinder 30 is moved back and forth in the direction of the optical axis while rotating to follow the cam slots 10a.

The first lens cylinder 40 has a lens support frame 41 fixed therein to its front portion for holding a first lens group L1 (see FIG. 1), and relatively wide guide grooves 40b (see FIG. 3) formed in its inner circumferential surface at respective positions circumferentially trisecting the same. Later-described key portions 80b of the float key 80 are fitted at their outer surface sides in the guide grooves 40b, whereby the first lens cylinder 40 is restricted so as to move only in the direction of the optical axis. Drive rollers 40a are fixed to an outer circumferential surface of the first lens cylinder 40 in its rear end portion at respective circumferentially trisected positions, the drive rollers 40a being fitted in the cam grooves 30a of the cam cylinder 30.

The second lens cylinder 50 has a lens support frame 51 fixed therein for holding a second lens group L2 (see FIG. 1), and relatively circumferentially wide guide recesses 50b (see FIG. 3) having a front end wall 50c, opened rearwardly and formed in its outer circumferential surface at respective positions circumferentially trisecting the same. The key portions 80b of the float key 80, fitted at their outer surface sides in the guide grooves 40b, are fitted at their inner surface sides in the guide recesses 50b, whereby the second lens cylinder 50 is restricted to move only in the direction of the optical axis. Thus, the key portions 80b of the float key 80 are held in sandwiched relation between the guide grooves 40b and the guide recesses 50b. A drive roller 50a is fixed to the outer circumferential surface of the second lens cylinder 50 in its rear end portion at a position between every adjacent pair of the guide recesses 50b. In other words, the drive rollers 50a are fixed to the outer circumferential surface of the second lens cylinder 50 in its rear end portion at respective circumferentially trisected positions. The drive rollers 50a are fitted in the cam grooves 30b of the cam cylinder 30.

Incidentally, the shutter unit 52 and the shutter blade 54 are provided on the second lens cylinder 50, as mentioned above, to be moved back and forth together with the second lens cylinder 50.

The third lens cylinder 60 has a lens support frame 61 fixed therein for holding a third lens group L3 (see FIG. 1), and relatively wide guide cut-outs 60b (see FIG. 3) extending in the circumferential direction and formed in its outer circumferential surface at respective positions circumferentially trisecting the same. The key portions 80b of the float key 80 held between the guide grooves 40b and the guide recesses 50b are fitted to the guide cut-outs 60b, whereby the third lens cylinder 60 is restricted to move only in the direction of the optical axis. A drive roller 60a is fixed to the outer circumferential surface of the third lens cylinder 60 at a position between every adjacent pair of the guide cut-outs 60b. In other words, the drive rollers 60a are fixed to the outer circumferential surface of the third lens cylinder 60 at respective circumferentially trisected positions. The drive rollers 60a are fitted in the cam grooves 30c of the cam cylinder 30.

Between a front end face of the third lens cylinder 60 and a rear end face of the second lens cylinder 50, the elastic member 90 in the form of a coil spring is stretched to absorb play in fitting between the drive rollers 50a, 60a and the cam slots 30b, 30c, respectively.

The float key 80 is constituted by an annular base 80c having a front portion fitted to the inner circumference of the cam cylinder 30 in its rear portion, three key portions 80b extending forwardly from the front side of the annular base 80c from respective circumferentially trisected positions, rectangular fitting holes 80e bored in the key portions 80b at positions nearer to the annular base 80c, respectively, with their long sides extending in the direction of the optical axis, and guide projections 80a formed on an outer circumferential surface of the annular base 80c in its rear end portion at respective positions circumferentially bisected, the guide projections 80a being fitted in the straightforward grooves 10b of the stationary cylinder 10. The float key 80 is received at a rear end face of the annular base 80c by key receiving members 34, which are fixed in place by the aforesaid screws 33 at the same time that the drive rollers 32 for zooming operation are fixed by the screws 33 to the outer circumferential surface of the cam cylinder 30 in its rear end portion at respective circumferentially trisected positions. The float key 80 is thereby movable in the direction of the optical axis together with the cam cylinder 30, but prevented from rotating about the optical axis O as the guide projections 80a are fitted in the straightforward grooves 10b of the stationary cylinder 10. Further, the three key portions 80b extending forwardly are inserted through the guide cut-outs 60b of the third lens cylinder 60, the guide recesses 50b of the second lens cylinder 50 and the guide grooves 40b of the first lens cylinder 40.

The flare diaphragm 100 (see FIG. 3) is constituted by an annular circumferential wall 100b formed to extend forwardly from an outer circumferential edge of a thin disk which has a flare diaphragm aperture 100c bored at the center, resilient attachment lugs 100a extending forwardly from a front surface of the annular circumferential wall 100b at respective circumferentially trisected positions, and lock pawls 100d formed on outer surfaces of the attachment lugs 100a at their front ends. The flare diaphragm 100 is fitted into the float key 80 from the rear side along its inner circumferential wall surface to be out of interference with the third lens cylinder 60, and the lock pawls 100d of the attachment lugs 100a are resiliently engaged in the rectangular fitting holes 80e. The flare diaphragm 100 is thereby attached to a rear portion of the float key 80 in such a manner as able to move in the direction of the optical axis through a distance corresponding to the length of the fitting holes 80e.

Incidentally, as shown in FIG. 1, an O ring 11 is disposed between the inner circumferential surface of the front cover 2 at its front end portion and the outer circumferential surface of the stationary cylinder 10 at its front end portion to provide an optical light and fluid sealing. Likewise, elastic rings 12, 31 are disposed between the inner circumferential surface of the stationary cylinder 10 at a position nearer to its front end and the outer circumferential surface of the cam cylinder 30 and between the front end surface of the cam cylinder 30 and the outer circumferential surface of the first lens cylinder 40, respectively, to provide an optical and fluid sealing.

Figures 4A, 4B:
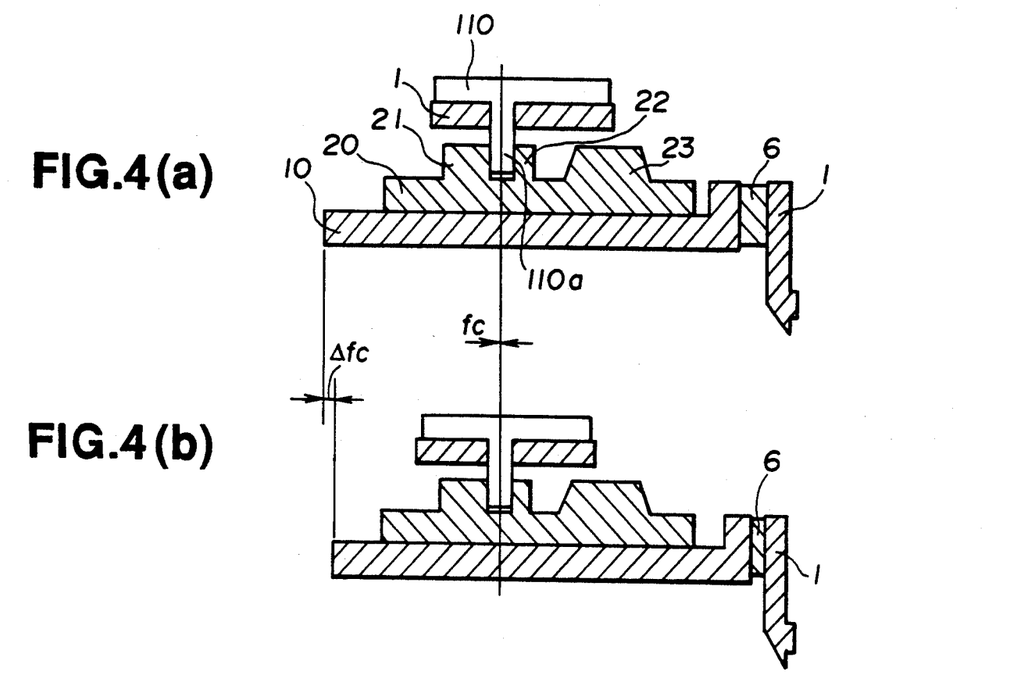
FIG. 4 is an enlarged sectional view showing a finder driving cam member, a finder optical system and thereabout in the camera of the first embodiment.

A description will now be given of a principal part in the camera of the first embodiment by referring to FIG. 4.

As explained above, the drive cylinder 20 fitted over the outer circumference of the stationary cylinder 10 includes the drive gear 21, the guide rib 22 and the interlock cam 23 which are all provided on the outer circumferential surface of the drive cylinder 20 in the form of a partial circular arc and are arranged in this order from the front. The drive gear 21 and the guide rib 22 are disposed with a spacing therebetween corresponding to a diameter of the guide pin 110a which is provided integrally with the finder frame 110. With the guide pin 110a fitted between the drive gear 21 and the guide rib 22, the drive cylinder 20 cannot move in the direction of the optical axis by being restricted by the guide pin 110a as an integral part of the camera body 1. Incidentally, the drive cylinder 20 is free to rotate about the optical axis without being restricted by the guide pin 110a.

A spacer 6 for the in-focus position (fc) adjustment is fitted between a base end of the stationary cylinder 10 and the camera body 1, as shown, to restrict the position of the stationary cylinder 10 in the direction of the optical axis depending on a difference in thickness of the spacer in the direction of the optical axis, thereby carrying out the fc adjustment. Details of the fc adjustment will be described later.

Figure 5:
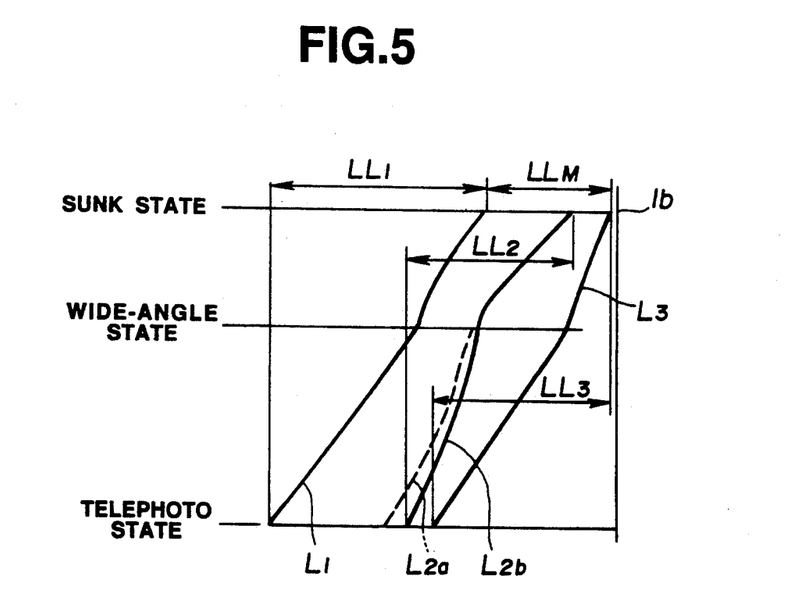
FIG. 5 is a diagram showing states of movement of respective lens groups in the camera of the first embodiment.

Operation of the camera having the zoom lens barrel thus constructed will be next described with reference to FIGS. 2 to 5. FIG. 5 is a diagram showing movement of the respective lens groups in the zoom lens barrel from a sunk state to a telephoto state.

First, an output gear of a zoom motor unit (not shown) is brought into mesh with the drive gear 21, causing the drive cylinder 20 to rotate in the direction A or B (see FIG. 2). Assuming now that the drive cylinder 20 is rotated in the direction A from the sunk state, the cam cylinder 30 is moved in the direction C of the optical axis (see FIG. 2), while rotating in the direction A, in accordance with the relationship between the elongate guide slots 20a and the cam slots 10a. At this time, the float key 80, which is free to rotate with respect to the cam cylinder 30 but integral therewith in the direction of the optical axis, is not allowed to rotate with the guide projections 80a fitted in the straightforward grooves 10b, and hence moved straight in the direction C of the optical axis. Since the first lens cylinder 40, the second lens cylinder 50 and the third lens cylinder 60 are arranged to be preverted from rotating with respect to the float key 80, as explained above, the first lens cylinder 40, the second lens cylinder 50 and the third lens cylinder 60 are only moved straight without rotating.

The cam grooves formed in the cam cylinder 30 comprise, as explained above, the cam groove 30a for the first lens group, the cam groove 30b for the second lens group, and the cam groove 30c for the third lens group. Maximum amounts of movement LL1, LL2, LL3 of the respective lens groups resulted from the relationship between the cam grooves 30a, 30b, 30c and the cam slots 10a are shown in FIG. 5. The maximum amounts of movement LL1, LL2, LL3 respectively indicate maximum amounts of movement of the first lens group L1, the second lens group L2 and the third lens group L3. Also, reference characters L1, L2a, L2b, L3 in FIG. 5 indicate respective paths of movement of the lens groups. Thus, L1 indicates a path of the first lens group, L2a, L2b paths of the second lens group in nearest and infinite conditions, and L3 a path of the third lens group. Additionally, 1b denotes a film plane and LLM represents a minimum length from the lens support frame 41 to the drive rollers 60a.

Taking the float key 80 as a reference, the cam cylinder 30 is only rotated and, therefore, the lens groups are moved from the sunk state toward the telephoto state upon rotation of the cam cylinder 30, as shown in FIG. 5.

Conversely, when the output gear of the zoom motor unit is rotated in a reversed direction, the drive cylinder 20 rotates in the direction B (see FIG. 2) and, as a result, the lens groups are moved from the telephoto state toward the sunk state following the paths shown in FIG. 5.

The cut-out 20b formed in the drive cylinder 20 comes into engagement with the stop projection 10d provided on the stationary cylinder 10 for restricting rotation of the drive cylinder 20, when the drive cylinder 20 goes on to rotate toward the sunk side in excess of the sunk state and when it goes on to rotate toward the telephoto side in excess of the telephoto state.

A description will now be given of the Zp adjustment and the fc adjustment in the camera having the above-mentioned zoom lens barrel by referring to FIGS. 2 to 4.

First, the Zp adjustment is carried out as follows. By rotating the third lens support frame 61 screwed into the third lens cylinder 60, the position of the third lens support frame 61 with respect to the third lens cylinder 60 in the direction of the optical axis is changed. Thus, the position of the third lens group L3 is changed with respect to the first lens group L1 and the second lens group L2. By so changing, accordingly, a difference in amount of fc adjustment between the wide-angle state and the telephoto state can be made smaller than a predetermined value.

The fc adjustment will be next explained. In this first embodiment, as stated above, the spacer 6 for the fc adjustment is inserted between the camera body 1 and the base end of the stationary cylinder 10 to change the position of the stationary cylinder 10 with respect to the camera body 1 in the direction of the optical axis, i.e., the respective positions of the first lens group L1, the second lens group L2 and the third lens group L3 in the direction of the optical axis, depending on the thickness of the spacer 6.

Stated otherwise, by varying the thickness of the spacer 6, an fc value (indicated by fc in FIG. 4) of the zoom lens barrel in the camera of this first embodiment can be made as close as possible to "0".

Upon the fc adjustment being carried out in that way, since the drive cylinder 20 is locked by the guide pin 110a as mentioned above, the drive cylinder 20 is forced to more relatively with respect to the stationary cylinder 10 in the direction of the optical axis. However, since the drive cylinder 20 engages the drive rollers 32 only through the elongate guide slots 20a extending in the direction of the optical axis as seen from FIG. 2, the above relative movement in the direction of the optical axis keeps the cam cylinder 30 and the float key 80 immobile with respect to the stationary cylinder 10. Consequently, the lens groups L1 to L3 are not moved in the direction of the optical axis relatively to each other.

That process will be described in more detail. As will be seen from comparing an upper portion (a) and a lower portion (b) in FIG. 4, when the thickness of the spacer 6 is changed by Δfc, the position of the stationary cylinder 10 in the direction of the optical axis is also displaced by Δfc correspondingly. But the position of the drive cylinder 20 in the direction of the optical axis is kept fixed regardless of such a displacement of the stationary cylinder 10. Thus, the zoom lens barrel is arranged such that the drive cylinder 20 will not move with respect to the camera body 1 in the direction of the optical axis even with the fc adjustment. Therefore, the interlock cam 23 integral with the drive cylinder 20 is kept relatively immobile with respect to the finder fixed to the camera body 1. Consequently, after the fc adjustment has been performed, the interlock cam 23 does not have to be positioned again with respect to the drive cylinder 20 in the direction of the optical axis unlike the prior art (see FIG. 8), and the finder can exhibit its predetermined optical capability without troubles.

As explained above, the camera of this first embodiment has the following advantages.

1. Since it is not required to position the interlock cam 23 again with respect to the drive cylinder 20 in the direction of the optical axis even after carrying out the fc adjustment, the cost involved in repositioning the interlock cam 23 can be saved.

2. Since the drive cylinder 20 and the interlock cam 23 can be formed into a one-piece unit, the cost can be cut down with the reduced number of parts.

Figure 7:
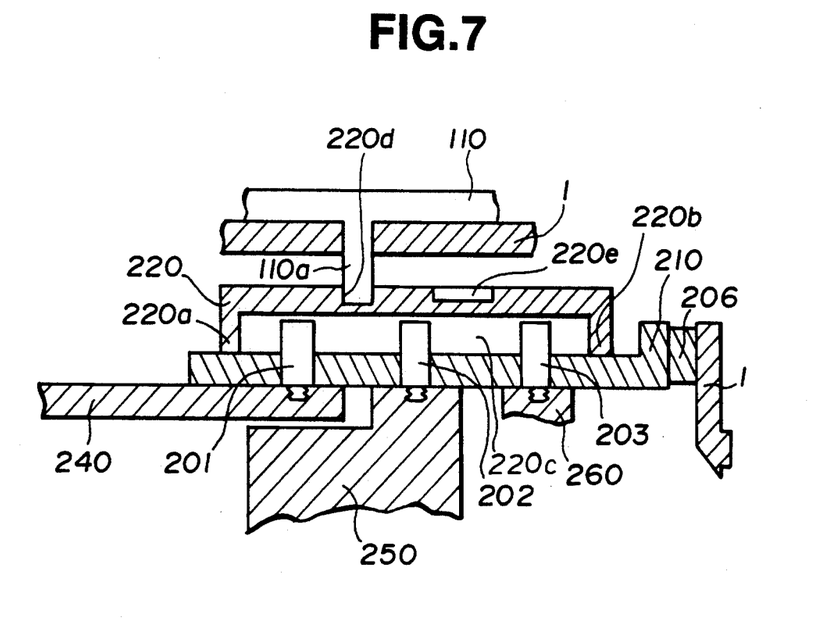
FIG. 7 is an enlarged sectional view showing a finder driving cam member, a finder optical system and thereabout in a camera according to a second embodiment of the present invention.

FIG. 7 is a sectional view showing the arrangement of a principal part in a camera according to a second embodiment of the present invention.

The camera of this second embodiment is basically arranged similar to the above first embodiment except that while each cam in the above first embodiment comprises two cam means, each cam in this second embodiment comprises a single cam means. Also, while the drive cylinder 20 in the camera of the above first embodiment is provided on its outer circumferential surface with the interlock cam 23 for the finder and has the circumferential groove defined by the drive gear 21 and the guide rib 22 to be fitted with the guide pin 110a of the finder, a drive cylinder in this second embodiment is arranged such that its opposite end faces in the direction of the optical axis directly serve as interlock cams for the finder, and a circumferential groove in which the guide pin of the finder is to be fitted comprises a simple groove formed in an outer circumferential surface of the drive cyclinder.

More specifically, as shown in FIG. 7, a stationary cylinder 210 is fixed to a camera body 1 via a spacer 206 for the fc adjustment, and a first lens cylinder 240 holding a first lens group (not shown), a second lens cylinder 250 holding a second lens group (not shown) and a third lens cylinder 260 holding a third lens group (not shown) are fitted to an inner circumference of the stationary cylinder 210. A first group roller 201, a second group roller 202 and a third group roller 203 are fixedly provided on the first lens cylinder 240, the second lens cylinder 250 and the third lens cylinder 260, respectively.

A drive cylinder 220 is fitted over an outer circumference of the stationary cylinder 210. A guide groove 220c extending in the direction of the optical axis is formed in an inner circumferential surface of the drive cylinder 220, and interlock cams 220a, 220b for driving a finder (not shown) are formed at opposite end faces of the drive cylinder 220 in the direction of the optical axis. See FIG. 3 of U.S. Pat. No. 4,945,372 showing finder 16. The drive cylinder 220 is also provided in its outer circumferential surface with a drive gear 220e and a circumferential groove 220d. Fitted in the circumferential groove 220d is a guide pin 110a, which is provided integrally with a finder frame 110 fixed to the camera body 1, through a hole formed in the camera body 1.

The camera of this second embodiment thus constructed operates basically similar to the camera of the above first embodiment. In addition to presenting similar advantages obtainable with the above first embodiment, this second embodiment is also advantageous in that a degree of freedom is increased in design of the circumferential groove for restricting a position of the finder in the direction of the optical axis, and of the interlock cams for driving the finder.

According to the cameras of the first and second embodiments, as described above, since a cam member for driving a finder is relatively immovable with respect to the finder so that the cam member and the finder may be formed into a one-piece unit, there can be provided a lens barrel with which in-focus position adjustment of a photographing optical system can be performed during assembly with no need of adjusting a position of finder driving means, and the cost can be cut down correspondingly.

In this invention, it is apparent that working modes different in a wide range can be formed on the basis of this invention without departing from the spirit and scope of the invention. This invention is not restricted by any specific embodiment except being limited by the appended claims.

What is claimed is:

1. A camera comprising:
   a stationary frame adjustable in position with respect to a camera body in a direction of an optical axis;
   a cam frame disposed around an outer circumference of said stationary frame to be rotatable about the optical axis and movable in a direction of the optical axis with respect to said stationary frame;
   a finder optical system provided on said camera body; and
   a finder optical system driving cam provided integrally with said cam frame for driving said finder optical system,
   wherein in-focus position adjustment of a photographing optical system of said camera is performed during assembly by moving only said stationary frame in the direction of the optical axis, while said cam frame is kept immobile with respect to said camera body.

2. A camera according to claim 1, wherein positions of said camera body and said stationary frame in the direction of the optical axis are relatively changed by a spacer inserted between said camera body and said stationary frame.

3. A camera according to claim 2, wherein said spacer is a circular ring shape.

4. A camera according to claim 1, wherein said finder optical system driving cam is formed integrally with an outer circumference of said cam frame.

5. A camera according to claim 1, wherein said finder optical system driving cam and said cam frame are simultaneously formed together as one piece.

6. A camera according to claim 1, wherein said stationary frame is moved back and forth during assembly under a condition that said stationary frame is prevented from rotating about the optical axis.

7. A camera according to claim 1, wherein said stationary frame is formed with a cam groove inclined relative to the optical axis and said cam frame is formed with a cam groove extending in a direction of the optical axis.

8. A camera comprising:
   a stationary frame adjustable in position with respect to a camera body in the direction of an optical axis, and formed with a cam groove inclined relative to the optical axis;
   a cam frame disposed around an outer circumference of said stationary frame to be rotatable about the optical axis and movable in the direction of the optical axis with respect to said stationary frame, and formed with a cam groove extending in the direction of the optical axis;
   a photographing optical system holding frame provided with a cam follower to be fitted in said cam grooves of said stationary frame and said cam frame;
   a finder optical system provided on said camera body; and
   a finder optical system driving cam provided integrally with said cam frame for driving said finder optical system,
   wherein in-focus position adjustment of a photographing optical system of said camera is performed during assembly by moving only said stationary frame in the direction of the optical axis, while said cam frame is kept immobile with respect to said camera body.

9. A camera comprising:
   a stationary frame formed with a cam groove inclined relative to an optical axis;
   a cam frame rotatable about the optical axis with respect to said stationary frame, and formed with a cam groove extending in the direction of the optical axis;
   a photographing optical system holding frame driven to move back and forth in the direction of the optical axis through said cam grooves of said stationary frame and said cam frame;
   a finder optical system provided on said camera body; and
   a finder optical system driving cam provided integrally with said cam frame for driving said finder optical system,
   wherein in-focus position adjustment of a photographing optical system of said camera is performed during assembly by moving only said stationary frame in a direction of the optical axis, while said cam frame is kept immobile with respect to said camera body.

10. A camera comprising:
    a stationary frame supported to be adjustable in position with respect to a camera body in a direction of an optical axis;
    a cam frame disposed around said stationary frame to be capable of behavior other than movement in the direction of the optical axis and movable in a direction of the optical axis;
    another unit fixed to said camera body; and
    a drive cam provided integrally with said cam frame for driving said another unit,
    wherein a position of said cam frame in the direction of the optical axis is restricted by said another unit irrespective of a position of said stationary frame in the direction of the optical axis.

11. A camera according to claim 10, wherein said another unit is a zoom finder unit.

12. A camera according to claim 10, wherein said another unit is a zoom flash unit.

13. A camera comprising:
    a stationary frame supported to be adjustable in position with respect to a camera body in a direction of an optical axis;
    a cam frame disposed around said stationary frame to be rotatable about the optical direction and movable in a direction of the optical axis;
    another unit fixed to said camera body; and
    a drive cam provided integrally with said frame for driving said another unit,
    wherein a position of said cam frame in the direction of the optical axis is restricted by said another unit irrespective of a position of said stationary frame in the direction of the optical axis.

14. A camera according to claim 13, wherein said another unit is a zoom finder unit.

15. A camera according to claim 13, wherein said another unit is a zoom flash unit.

16. A camera comprising:
- a finder frame member fixed to a stationary member of a camera body for holding a finder optical system;
- a lock member projecting from said finder frame member;
- a stationary frame fixed to the stationary member of said camera body and serving as a reference of a holder frame for holding a photographing optical system; and
- a cam frame fitted over an outer circumference of said stationary frame and moving said holder frame in the direction of an optical axis in cooperation with said stationary frame,
- wherein said cam frame has cam means for moving a finder optical system synchronously with movement of said photographing optical system in a direction of the optical axis, and movement of said cam frame in a direction of the optical axis is restricted by a member which is immovable with respect to said camera body.

17. A camera according to claim 16, wherein said member which is immovable with respect to said camera body is the lock member of said finder frame member.

18. A camera comprising:
- a finder optical system holding system fixed to a stationary member of a camera body for supporting a finder optical system;
- a stationary frame fixed to the stationary member of said camera body for supporting a photographing optical system;
- a cam frame rotatable fitted over said stationary frame; and
- lock means provided between said finder optical holding system and said cam frame,
- wherein said lock means restricts movement of said cam frame in the direction of the optical axis with respect to said finder optical system holding member, but allows said cam frame to rotate with respect to said stationary frame.

19. A camera wherein a positioning member provided on a finder optical system holding member, which positions a finder optical system with respect to a stationary member of a camera body, restricts movement of a cam frame fitted over a stationary frame in a thrust direction of said cam frame.

20. A camera having a zoom lens and a zoom finder, said camera comprising:
- a stationary frame supporting at least one movable frame;
- a cam ring for moving said movable frame in a direction of an optical axis for zooming operation;
- said zoom finder having a finder stationary frame which is fixed to a camera body and formed with a projection, and also having at least one movable lens which is moved for zooming operation of said finder; and
- a finder cam ring rotatable together with said cam ring,
- wherein said movable lens is fitted to said finder cam ring so that said finder performs zooming operation with rotation of said finder cam ring, and a circumferential groove is formed in said cam ring to be engaged with said projection for prohibiting movement of said finder cam ring in a direction of the optical axis, while allowing said finder cam ring to rotate about the optical axis, and
- a zooming condition of said finder is not changed even when said stationary frame is moved in the direction of the optical axis for adjusting a back focus of said movable zoom lens.

21. A camera having a zoom lens and a zoom finder, said camera comprising:
- a photographing optical system having a variable focal length;
- a finder optical system having an image magnification variable in conjunction with the focal length of said photographing optical system;
- interlock means for interlocking said photographing optical system and said finder optical system;
- adjusting means for adjusting a back focus of said photographing optical system; and
- image magnification change preventing means by which no change is imparted to the image magnification of said finder optical system when the back focus of said photographing optical system is adjusted by said adjusting means, and which eliminates a need of adjusting a back focus of said photographing optical system even after the adjustment of said photographing optical system.

22. A camera according to claim 21, wherein said image magnification change preventing means comprises a projection formed on said finder stationary frame and a circumferential groove formed in said interlock means circumferentially about an optical axis, said projection and said circumferential groove being engaged with each other.

23. A camera according to claim 21, wherein said interlock means comprises cam means for controlling movement of a movable lens in said finder optical system.

24. A method for adjusting a camera during assembly thereof, said camera comprising:
- a stationary frame adjustable in position with respect to a camera body in a direction of an optical axis;
- a cam frame disposed around an outer circumference of said stationary frame to be rotatable about the optical axis and movable in a direction of the optical axis with respect to said stationary frame;
- a finder optical system provided on said camera body; and
- a finder optical system driving cam provided integrally with said cam frame for driving said finder optical system, said method comprising the steps of:
- adjusting the in-focus position of a photographing optical system operated by said cam frame and said stationary frame during assembly of the camera by moving only said stationary frame in the direction of the optical axis to achieve an in-focus position; and
- maintaining said cam frame immobile with respect to said camera body as said in-focus position adjustment is being performed.

25. The method of claim 24 wherein the step of making the in-focus adjustment further comprises inserting a spacer between said camera body and said stationary frame to maintain the in-focus adjustment.

26. The method of claim 24 wherein said camera photographing optical system is comprised of first, second and third lens groups, one of said lens group being adjustable relative to a cam follower provided as part of said lens group, which cam follower is driven by said stationary frame and said cam frame, said method further comprising the step of:

adjusting a displacement at said third lens group relative to its cam follower in the optical axis direction to change the position of the third lens group with respect to the first and second lens groups to reduce a difference in an adjustment amount between a wide angle state and a telephoto state so as to maintain the difference to be smaller than a predetermined value.

* * * * *

UNITED STATES PATENT AND TRADEMARK OFFICE
CERTIFICATE OF CORRECTION

PATENT NO. : 5,293,192
DATED : March 8, 1994
INVENTOR(S) : Akitake et al.

It is certified that error appears in the above-indentified patent and that said Letters Patent is hereby corrected as shown below:

Column  1, line 36, change "dnd" to --end--

Column  8, line 30, change "preverted" to --prevented--

Column  9, line 36, change "more" to --move--

Column 14, line 66, change "group" to --groups--

Signed and Sealed this

Thirtieth Day of August, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,293,192
DATED : March 8, 1994
INVENTOR(S) : Akitake et al

It is certified that error appears in the above-indentified patent and that said Letters Patent is hereby corrected as shown below:

Column 1, lne 36, change "dnd" to --end --.
Column 8, line 27, after "hence" insert --is --.
Column 8, line 30, change "preverted" to --prevented --.
Column 9, line 36, chnage "more" to --move --.
Column 14, line 66, change "group" to --groups --.

This certificate supersedes certificate of correction issued July 18, 1994.

Signed and Sealed this

Twentieth Day of September, 1994

Attest:

BRUCE LEHMAN

Attesting Officer   Commissioner of Patents and Trademarks